(12) United States Patent
Bailey

(10) Patent No.: US 10,691,991 B1
(45) Date of Patent: Jun. 23, 2020

(54) COMPUTER-BASED SYSTEMS AND METHODS INVOLVING BIOMETRIC AUTHENTICATION ASPECTS FOR HANDLING EXCEPTIONS, ENABLING DEACTIVATION AND/OR PERFORMING OTHER FUNCTIONALITY

(71) Applicant: Capital One Services, LLC, McLean, VA (US)

(72) Inventor: Michael Bailey, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/731,624

(22) Filed: Dec. 31, 2019

(51) Int. Cl.
*G06K 19/07* (2006.01)
*G06K 19/073* (2006.01)
*G06Q 20/34* (2012.01)

(52) U.S. Cl.
CPC ... *G06K 19/0718* (2013.01); *G06K 19/07345* (2013.01); *G06Q 20/3437* (2013.01); *G06Q 20/354* (2013.01); *G06Q 20/355* (2013.01); *G06Q 2220/10* (2013.01)

(58) Field of Classification Search
CPC .................................................. G06K 19/0718
USPC ........................................... 235/380; 705/72
See application file for complete search history.

(56) References Cited

U.S. PATENT DOCUMENTS

| | | | |
|---|---|---|---|
| 2007/0275777 A1* | 11/2007 | Walker | G07F 17/3227 463/16 |
| 2015/0127553 A1* | 5/2015 | Sundaram | G06K 19/0716 705/72 |
| 2019/0222576 A1* | 7/2019 | Borkar | G06Q 20/40 |
| 2019/0379658 A1* | 12/2019 | Wurmfeld | G06F 21/31 |
| 2020/0043002 A1* | 2/2020 | Koeppel | H04L 63/0853 |
| 2020/0043003 A1* | 2/2020 | Corella | G06Q 20/3821 |

* cited by examiner

*Primary Examiner* — Allyson N Trail
(74) *Attorney, Agent, or Firm* — Greenberg Traurig, LLP

(57) ABSTRACT

Systems and methods involving biometric authentication of transaction cards including aspects of exception handling, deactivation and other features are disclosed. In one embodiment, an exemplary computer-implemented method may comprise generating a first user interface having a plurality of interactive UI elements that enable a card owner to manage a plurality of features associated with a transaction card, and determining, if a biometric-activated control is enabled and the vendor is not excluded from the biometric-activated control, whether the transaction card is biometrically-active. Further, the plurality of interactive UI elements may include a first UI element that is configured to allow the card owner to enable a biometric-activated control of the transaction card, and a second UI element that is configured to allow the card owner to exclude one or more vendors from the biometric-activated control.

20 Claims, 8 Drawing Sheets

COMPUTER-BASED SYSTEMS AND METHODS INVOLVING BIOMETRIC AUTHENTICATION ASPECTS FOR HANDLING EXCEPTIONS, ENABLING DEACTIVATION AND/OR PERFORMING OTHER FUNCTIONALITY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices and/or improved transaction cards configured for one or more novel technological applications involving biometric authentication aspects configured for various functionality such as handling exceptions, enabling deactivation in certain instances and/or performing other features.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or account management involved with card-based transactions and related fraud prevention.

SUMMARY OF DESCRIBED SUBJECT MATTER

In some embodiments, the present disclosure provides various exemplary technically improved computer-implemented methods involving fraud prevention features for card-based transactions, the method comprising steps such as:

generating, by at least one computer processor, a first user interface having a plurality of interactive UI elements that enable a card owner to manage a plurality of features associated with a transaction card associated with the card owner;

wherein the plurality of interactive UI elements comprises:

a first UI element that is configured to allow the card owner to enable a biometric-activated control of the transaction card; and a second UI element that is configured to allow the card owner to exclude one or more vendors from the biometric-activated control; and determining, by the at least one computer processor, in connection with a transaction associated with a vendor and using the transaction card, if the biometric-activated control is enabled and the vendor is not excluded from the biometric-activated control, whether the transaction card is biometrically-active.

In some embodiments, the present disclosure also provides exemplary technically improved computer-based systems, transaction cards, and computer-readable media, including media implemented with and/or involving one or more software applications, whether resident on computer devices or platforms, provided for download via a server and/or executed in connection with at least one network and/or connection, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment"

and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, systems and methods involving biometric authentication for transaction cards including aspects of exception handling, deactivating such biometric authentication schemes and/or other features are disclosed. In one embodiment, an exemplary computer-implemented method may comprise generating a first user interface having a plurality of interactive UI elements that enable a card owner to manage a plurality of features associated with a transaction card, and determining, if a biometric-activated control is enabled and the vendor is not excluded from the biometric-activated control, whether the transaction card is biometrically-active for use in an attempted transaction. Further, the plurality of interactive UI elements may include a first UI element that is configured to allow the card owner to enable a biometric-activated control of the transaction card, and a second UI element that is configured to allow the card owner to exclude one or more vendors from the biometric-activated control.

In some embodiments, the innovations herein may be implemented in connection with a financial service entity that provides, maintains, manages, or otherwise offers financial services. Such financial service entity may be a bank, credit card issuer, or any other type of financial service entity that generates, provides, manages, and/or maintains financial service accounts that entail providing a transaction card for one or more customers, the transaction card being processed by a transacting device in regard to such financial services. Financial service accounts may include, for example, credit card accounts, bank accounts such as checking and/or savings accounts, reward or loyalty program accounts, debit account, and/or any other type of financial service account known to those skilled in the art.

Figure 1:
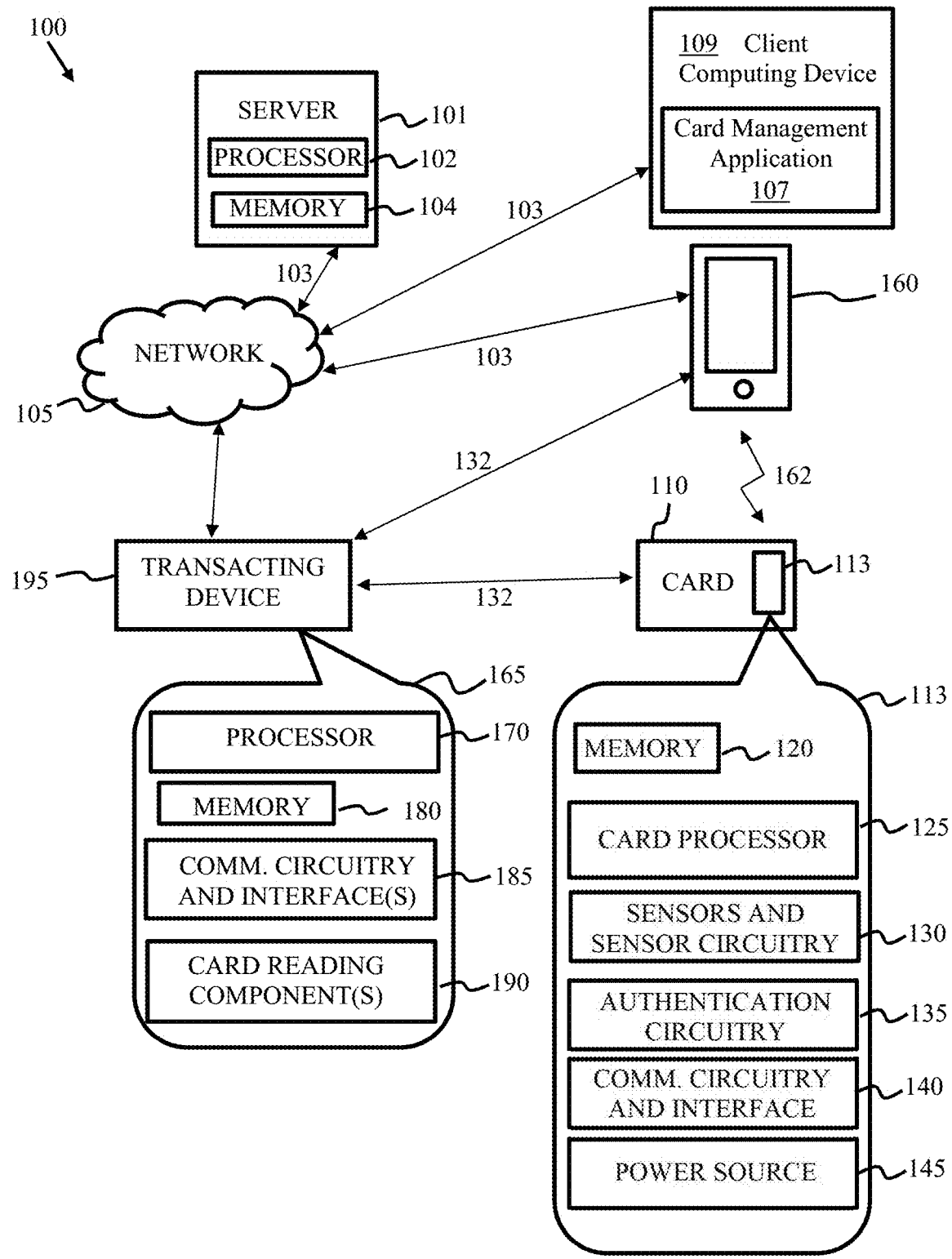
FIG. 1 is a block diagram of an exemplary system and/or platform involving fraud prevention features for card-based transactions, consistent with exemplary aspects of certain embodiments of the present disclosure.

FIG. 1 depicts an exemplary system 100 illustrating aspects of improved fraud prevention associated with use of a transaction cards, in accordance with one or more embodiments of the present disclosure. System 100 may include a server 101, a mobile device 160, a transaction card 110 with circuitry 113 disposed therein, and a transacting device 195, which may all communicate 103 over a communication network 105. Transacting device 195 may be a POS (point-of-service or point-of-sale) device, an online computer or server that is processing a network/Web transaction based on the transaction card 110, or any other terminal or computer that processes card-based transactions. When a user attempts a transaction with a transaction card, the business or merchant associated with the transacting device 195 and typically a financial institution, such as a credit card company that has issued the card to the user, may wish to determine whether the transaction is one that is authorized by the card owner. Some embodiments herein may also leverage the fact that the user of the transaction card is often near to the user's mobile device, such as a smartphone, smartwatch, tablet or the like, for example, and may use functionality associated with the user's mobile device and the transaction card, including interaction between the two, as a part of various fraud prevention and/or authentication processes for approving a transaction and/or authorizing use of the transaction card to purchase goods or services.

The exemplary system of FIG. 1 may include an exemplary computing device 109, such as a client computing device, associated with a user, such as an owner of the transaction card. In some embodiments, the exemplary computing device 109 may be configured to execute, among other programs, a card management application 107. In some embodiments, exemplary card management application 107 may be one or more software applications configured to perform operations consistent with providing a portal, e.g., via web pages, to the user, accessing online accounts, and managing aspects of transaction card accounts. The exemplary card management application 107 may provide various known functionality associated with managing a transaction card as well as functionality involved with the biometric activation features herein, such as shown and described below in connection with FIG. 4. Card management application 107 may also be hosted and/or operated, in whole or in part, by at least one remote system and/or server, such as by a server of a financial services entity that provides the transaction card 110 to the card owner.

In some embodiments, server(s) 101 may be associated with one or more entities that are stakeholders to the attempted transaction, such as the business or merchant, one or more financial services providers, such as an issuer of a credit card, debit card, or other transaction card associated with the attempted transaction.

In the embodiment shown in FIG. 1, an illustrative transacting device 195 may comprise: one or more processing components and/or computer readable media 170, memory 180, communication circuitry and/or interfaces 185, and, optionally, at least one card reading component 190, e.g., when the transacting device 195 is a POS device. Such card reading component(s) 190 may be configured to read information from a transaction card 110, for example, the at least one card reading component may comprising one or more of a magnetic stripe reader, a chip reader, and/or a first near field communication (NFC) component. Communication circuitry and/or interfaces 185 may comprise at least one mobile device transceiver component configured to communicate, during execution of a purchase transaction, with a mobile device 160 presented for payment, the mobile device transceiver component comprising a second NFC component.

With regard to certain disclosed innovations, exemplary processing components and/or computer readable media 170 may be configured to execute instructions associated with performing methods such as that described below in more detail in connection with FIG. 3 and elsewhere herein.

Referring to FIG. 1, server 101 may include at least one processor 102 and a memory 104, such as random-access memory (RAM). In some embodiments, server 101 may be operated by the financial institution issuing the transaction card, by the merchant, and/or by any transaction processing entity involved with authorizing the transaction card for use.

In some embodiments, the transaction card 110 may be formed from plastic, metal, or any other suitable material. Exemplary transaction card 110 may include card circuitry 113 formed directly therein, and/or disposed therein by gluing, bonding or by any suitable adhesion method for affixing circuitry to the material of transaction card 110. Card circuitry 113 may be configured to utilize any hard-wired circuitry. Card circuitry 113 may be implemented as one or more integrated circuit chips, and/or electronic devices, electrically interconnected and bonded to one or more circuit boards, for example. Further details and embodiments of exemplary transaction cards are shown and described in connection with FIG. 2, below.

Referring to the high-level block diagram of FIG. 1, card circuitry 113 may include a memory 120, at least one processor 125, sensors and sensor circuitry 130, authentication circuitry 135, communication circuitry and interface 140, and, optionally, a power source 145. Memory 120 may store code, such as for the authentication circuitry 127, which when executed by processor 125 may cause processor 125 to implement various features herein (including pairing with mobile device 160) to perform fraud prevention. As set forth in more detail, below, such features may provide ways to verify whether or not a person attempting a transaction with the transaction card 110 is authorized to use the card, e.g., in approving or denying the transaction when the user attempts to use the transaction card to purchase goods or services.

In some embodiments, exemplary transaction card 110 may include one or more sensors and sensor circuitry 130, which may be connected via respective electrical connections to memory 120, card processor 125, authentication circuitry 135, communication circuitry and/or communication interface 140, and/or power source 145. With regard to the disclosed innovations, the exemplary sensors and sensor circuitry 130 may be configured to collect biometric information of the individual attempting to use the transaction card, as set forth in more detail below.

In some embodiments, power source 145 may be used to power card circuitry 113. Power source 145 may include, for example, a battery, a solar cell, and/or any suitable energy harvesting device, capable of generating enough power for powering card circuitry 113. In other embodiments, the transaction card may be powered upon swiping or inserted the card into a slot in a transaction device 195, e.g., where the electricity may come from a POS terminal or any other device into which the transaction card is swiped or inserted. The transaction card 110 may also be powered by movement, or by induction, or by other near-field electromagnetic energy derived from nearby sources, such as mobile device 160, transacting device 195, or other known sources. The transaction card may utilize such power in the process of performing the various fraud prevention functionality herein.

Mobile device 160, such as a smart phone or other portable or wearable electronic device, may include mobile device circuitry. Mobile device circuitry may include a mobile device processor, a memory, such as RAM, communication circuitry and interface, and any input and/or output device, such as a touchscreen display. The memory may store code that, when executed by processor, may cause processor to implement one or more aspects of various fraud prevention schemes herein, including those involving pairing with transaction card 110 to verify if a user of the transaction card 110 is an authorized user of the card. Mobile device may also display various graphical user interfaces that a card owner may utilize to control certain fraud prevention features herein, as set forth by way of one example in FIG. 4. In some embodiments, any transaction card application running on mobile device 160, such as an application supplied by the financial institution issuing the transaction card and/or managing the transactions of the transaction card owner, may include various modules that may transmit information to the transacting device, relay information back to the financial institution (e.g., server 101), and/or communicate with other computing components.

Various embodiments associated with FIG. 1 and related disclosure herein solve a technical problem of fraudulent electronic-card-based transactions via implementation of biometric, transaction-card-based card activation solutions that help ensure that a transaction card does not get used for fraudulent transactions. Various features and functionality disclosed herein may be utilized in connection with fraud prevention and/or authentication processes that involve pairing of transaction card 110 with mobile device 160 when implementing multi-factor authentication (MFA) schemes, for example, to authorize the card for use by the user. In other embodiments, various information related to the successful pairing of the transaction card and the mobile device may be relayed back to server 101 (e.g., server processor 102) so as to approve transactions for purchasing goods and/or services using a transaction card of an authorized and/or verified user.

In some embodiments, an initial authentication for pairing the transaction card with the mobile device may be implemented by the user contacting the financial institution from the user's mobile device to initially authorize the pairing of transaction card 110 with mobile device 160 so as to receive pairing approval. In other embodiments, the pairing and/or unpair processes between the transaction card and the mobile device may occur automatically and seamlessly such as without any action on the part of the user, particularly if the same mobile device had been previously paired with the same transaction card in the past. In yet other embodiments, proximity MFA may use biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the mobile device or client.

In some embodiments, when the transaction card may include a battery as power source 145, the transaction card and the mobile device may be configured to pair with the transaction card on the fly when the transaction card is used during a transaction, so as to conserve power stored in the battery.

In some embodiments, if the transaction card is determined to be in possession by an unauthorized individual via implementations herein, such as a result of interaction with a transacting device 195, an entity associated with the transaction, such as the merchant associated with the transacting device 195, may generate or receive an alarm or alert that the card user is potentially unauthorized (e.g., via network 195) or that additional authentication, such as second-factor authentication, should be performed to verify that the transaction is not fraudulent.

While only one server 101, computing device 109, network 105, transacting device 195, mobile device 160, and card 110 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 109 may be one or more computing devices configured to perform operations consistent with executing card management application 107.

Figure 2:
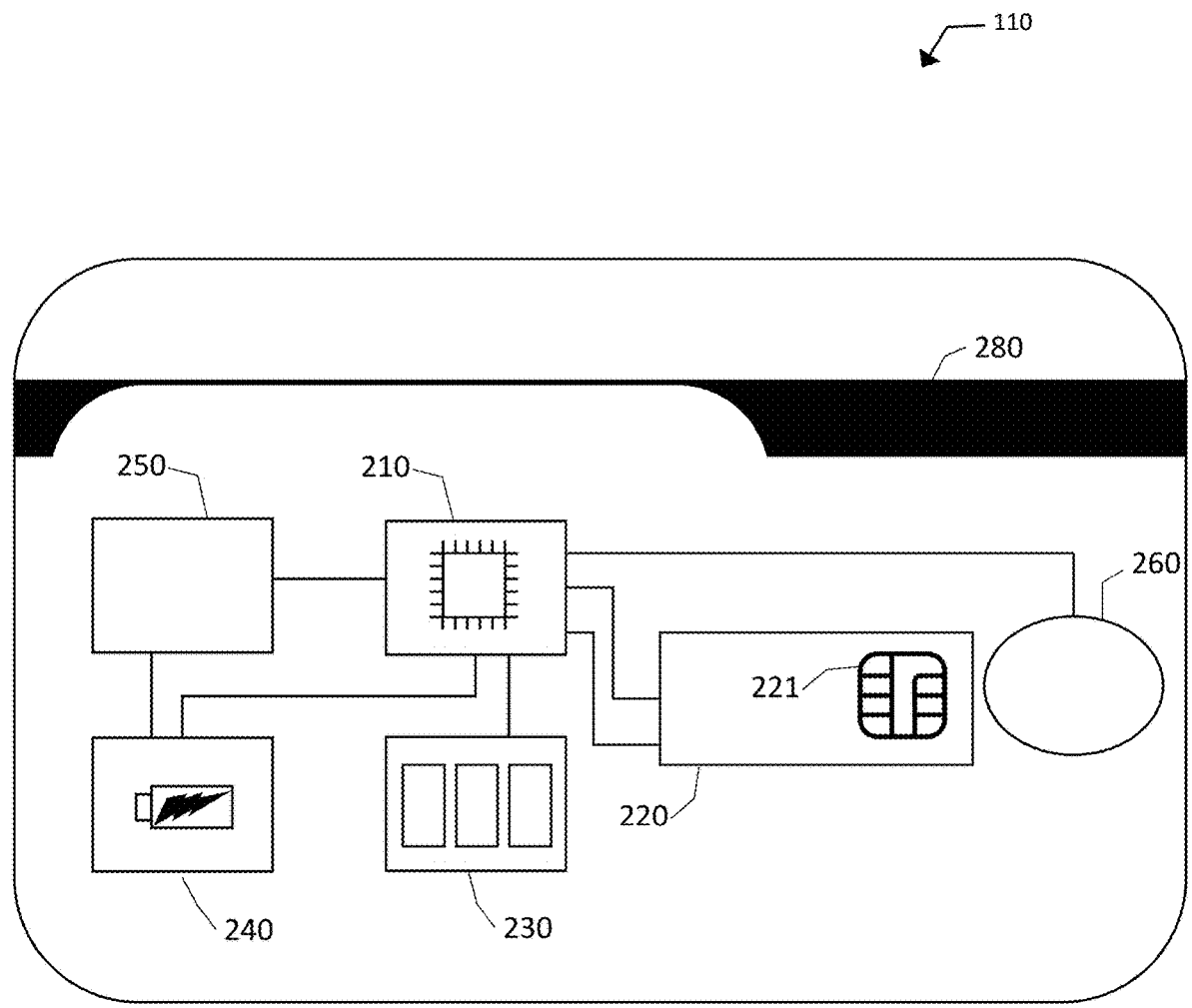
FIG. 2 is a block diagram of an exemplary transaction card, consistent with exemplary aspects of certain embodiments of the present disclosure.

FIG. 2 shows a diagram of an exemplary transaction card 110, consistent with disclosed embodiments. In some embodiments, transaction card 110 may be the approximate size and shape of a traditional credit card, debit card, or the like. Transaction card 110 may have embedded electronics for performing various aspects of the disclosed innovations. As shown, transaction card 110 may include subcomponents such as a processor 210 or processing circuitry, memory 230, power source or power circuitry 240, communication circuitry/devices 250, one or more sensors 260 such as biometric input elements and/or circuitry, a magnetic stripe 280, and other coupling circuitry 220 such as an electronic chip 221 element. Power source or power circuitry 240 may include elements that generate power for the card upon coupling to a POS device, such as by connection via an electronic chip 221, and/or such circuitry may include a voltage supply such as a battery. In some embodiments, transaction card 110 may include more or fewer components than shown in FIG. 2.

Processor 210 may comprise one or more known or specialized processing devices, of sufficient size and form factor to fit within transaction card 110 when configured to be about the size of a traditional credit or debit card. In some embodiments, processor 210 may include any configuration capable of performing functions related to the disclosed methods such as, for example, collecting sensor data such as biometric information of the card user, and generating, processing and transmitting data associated with the fraud prevention features herein. Processor 210 may also control power source 240, send and receive data, read from and write to memory 230, receive and analyze data from sensors 260, process information or instructions associated with the coupling circuitry 220, and any other functions consistent with the disclosed embodiments.

The card memory 230 may include volatile or non-volatile, magnetic, semiconductor, or other type of storage elements and/or tangible (i.e., non-transitory) computer-readable medium that stores relevant data, such as information needed for or associated with card transactions and/or fraud prevention. According to embodiments herein, the card memory 230 may also store user information, data or instructions needed or used by the card or the transacting device to achieve the innovations herein, other computer-executable instructions, and/or other data known in the art.

Power source 240 may include a power storage device such as a battery or capacitor, a power receiver such as an inductive power coil or a wireless power receiver, a power generator such as a solar or kinetic power generator, or any combination thereof. In some embodiments, power source 240 may include one or more other known devices capable of generating, receiving, and/or storing electrical energy.

The one or more card sensors 260 may comprise biometric input elements and/or circuitry. In some embodiments, such biometric input elements and/or circuitry 260 may include, for example, one or more of a fingerprint sensor, an optical sensor that detects one or more of a card user's face, eyes, or other distinguishing features of the card user, a sensor that detects electromagnetic energy emitted from the card user, and/or any biometric input that can uniquely identify a user.

Sensors 260 may also include one or more buttons, switches, other tactile input mechanisms, haptic sensors, or other forms of user-derived input for receiving an indication or instruction from a card user, which may also be utilized to authenticate a specific user, i.e., the card owner. In some embodiments, such input devices may receive a sequence or series of inputs, to cause processor 210 to perform various functions associated with the disclosed embodiments.

The transaction card may, optionally, also include a display, which may comprise a screen, indicator light, or other appropriate device for displaying a status or message to user. In some embodiments, display may include a small LCD screen, e-ink screen, or OLED display or one or more LEDs. In some embodiments, display may provide notifications, prompts, and/or messages to user.

In some embodiments, transaction card 110 may include communication circuitry/devices 250 such as antennae and/or NFC (near-field communication) circuitry, for transmitting and/or receiving data from one or more external locations. Communication circuitry 250 may comprise a short-range wireless transceiver, or a near-field communication (NFC) chip. Communication circuitry 250 may be configured to communicate with mobile device 160, a contactless card reader associated with the POS device, other systems, and/or other sensors configured to detect the presence of transaction card 110.

In some embodiments, transaction card 110 may include at least one magnetic stripe 280 or other magnetic communication medium that may store, share or read magnetically-stored information. In some embodiments, magnetic stripe 280 may be controlled by processor 210. For example, processor 210 may write, clear, and rewrite magnetic stripe 280, to provide particular account information.

Figure 3:
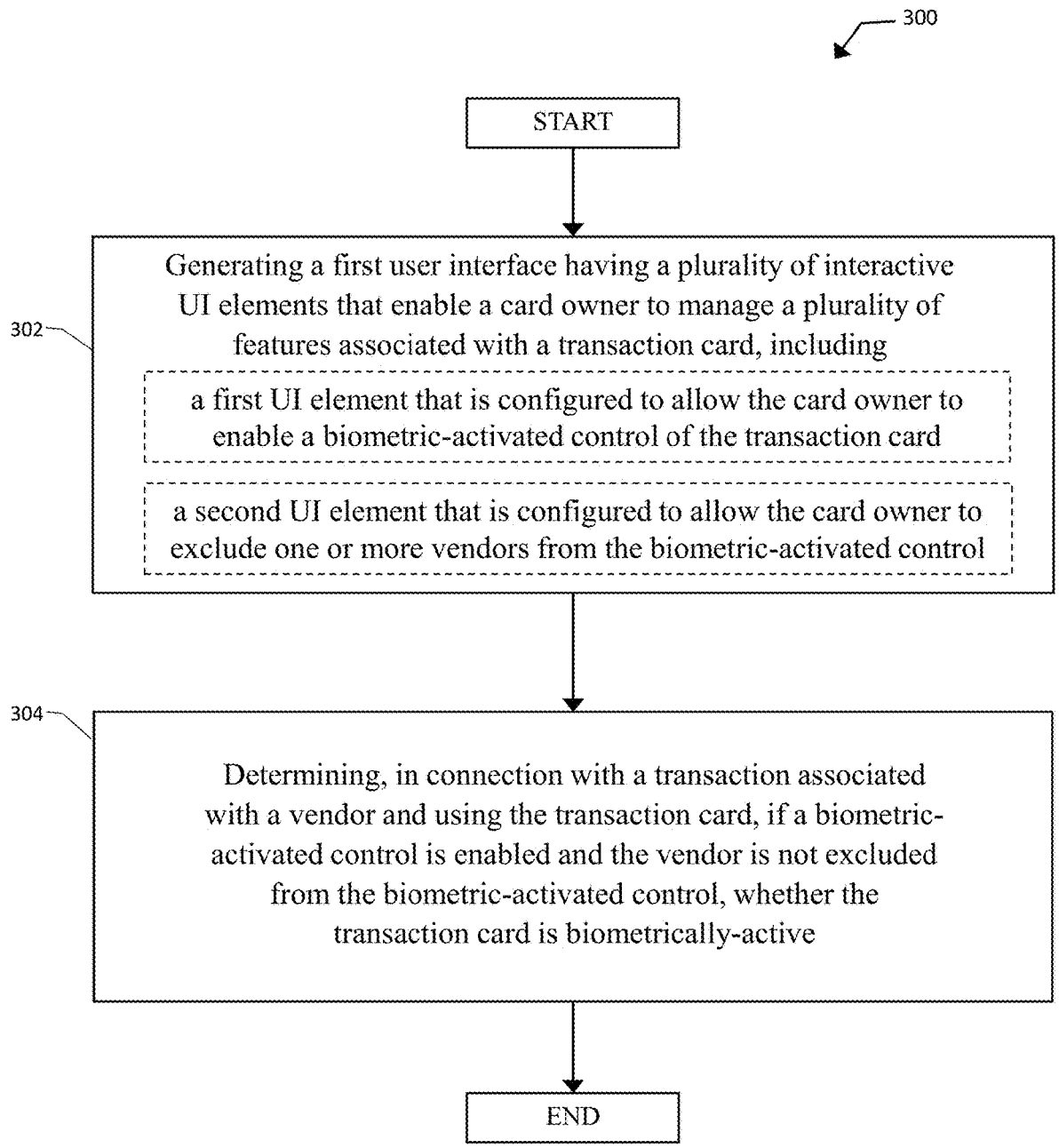
FIG. 3 is a flowchart illustrating one exemplary process related to performing fraud prevention associated with card-based transactions, consistent with exemplary aspects of certain embodiments of the present disclosure.

FIG. 3 is a flowchart illustrating one exemplary process related to performing fraud prevention for card-based transactions, consistent with exemplary aspects of certain embodiments of the present disclosure. As shown in the exemplary flowchart of FIG. 3, an illustrative card fraud prevention process 300 may comprise: generating a first user interface having a plurality of interactive UI elements that enable a card owner to manage a plurality of features associated with a transaction card, at 302; and determining whether the transaction card is biometrically-active, at 304. Further, the plurality of interactive UI elements generated in 302 may include a first UI element that is configured to allow the card owner to enable a biometric-activated control of the transaction card, and a second UI element that is configured to allow the card owner to exclude one or more vendors from the biometric-activated control. The fraud prevention process 300 may be performed in connection with card-based online transactions, e.g. via a portal or other network connection, and/or it may be carried out by in connection with card-based transactions, e.g., at POS devices.

In some embodiments, fraud prevention process 300 may include, at 302, a step of generating a first user interface having a plurality of interactive UI elements that enable a card owner to manage a plurality of features associated with a transaction card. An example of one such first user interface 400 is shown in FIG. 4, including a plurality of interactive UI elements utilized to manage aspects of the biometric authentication functionality set forth herein.

Figure 4:
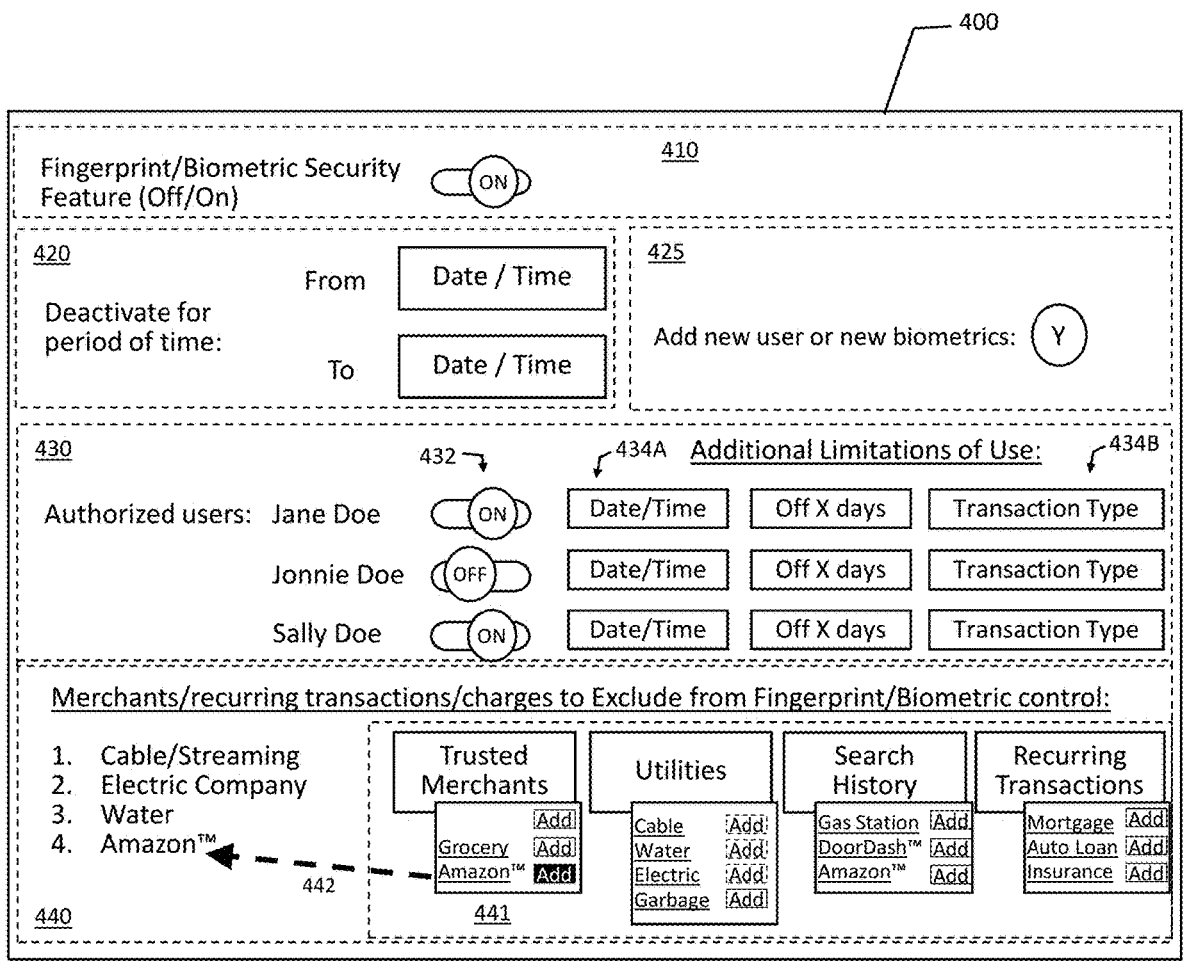
FIG. 4 is a diagram of an exemplary graphical user interface that may be associated with systems and methods of performing fraud prevention for card-based transactions, consistent with exemplary aspects of certain embodiments of the present disclosure.

FIG. 4 is a diagram of an exemplary graphical user interface that may be associated with systems and methods of performing fraud prevention for card-based transactions, consistent with exemplary aspects of certain embodiments of the present disclosure. Referring to FIG. 4, the plurality of features associated with the transaction card to be managed may include one or more of: turning on or turning off the biometric authentication or biometric security features herein, at 410; deactivating the biometric security features for a period of time, at 420; authorizing or not authorizing various users associated with the transaction card, at 432; specifying limitations of use for one or more users associated with the transaction card, at 434; and/or specifying charges, merchants and/or transactions to exclude from those that are subject to the biometric authentication features herein, at 440.

With regard to the disclosed innovations, such plurality of interactive UI elements may comprise, for example, a first UI element that is configured to allow the card owner to enable or disable biometric-activated control of the transaction card, at 410; and/or a second UI element that is configured to allow the card owner to exclude one or more vendors from the biometric-activated control, at 440. In some embodiments, the first user interface 400 may be provided as part of a portal or card management application 107 by which customers manage online accounts related to transaction cards. Further, according to various embodiments, methods disclosed herein may also include a step of providing the card owner with a portal having functionality to manage such biometric authentication features, i.e., prior to step 302.

According to disclosed embodiments, the plurality of interactive UI elements may also comprise a third UI element that is configured to allow the card owner to indicate one or both of a date range and/or a time range, to temporarily disable (or enable) the biometric-activated control, at 420. In one embodiment, the third UI element may be further configured to allow the card owner to indicate if the date range and/or the time range are to be set for recurring activation.

According to certain embodiments, the plurality of interactive UI elements may also comprise another UI element, at 425, that is configured to allow the card owner to provide biometric information for biometrically-activating the transaction card, such as a new fingerprint of a newly-authorized user. Functionality, such as that known in the art, may be provided for specifying a new user, such as a spouse, that is authorized to use the transaction card. Further, the first user interface 400 may be coupled to the transaction card 110, via one or more networks and computing devices, to coordinate receipt and recordation of the new biometric information. In one embodiment, for example, the transaction card 110 may be paired with the card owners mobile device 160, while the mobile device is coupled with a computing device 109 operating the first user interface 400. When the card owner specifies, via the portal, that a new biometric identifier is being provided, the new biometric information is transmitted through the mobile device 160 from the transaction card 110 such that the entity operating the first user interface 400 may establish a relationship between the new biometric information and the associated user. In some embodiments, the biometric information for biometrically-activating the transaction card may correspond to one or more individuals other than the card owner.

According to certain embodiments, the plurality of interactive UI elements may also comprise fourth UI element(s), at 430. With regard to fourth UI element(s) 430, embodiments disclosed herein may be configured such that the fourth UI element may comprise one or more of: a first option 434A that enables the card owner to select a date, and/or a date range regarding which the transaction card may be enabled or disabled for an approved individual; a second option 434A that enables the card owner to select a time, and/or a time range regarding which the transaction card may be enabled or disabled for an approved individual; and/or a third option 434B that enables the card owner to select one or more of: transactions, transaction types, vendor, vendor types, goods, services, types of goods and/or services (e.g., brick and mortar, online, virtual, etc.), etc. that are either included or excluded from those that the cardowner authorizes an approved user to purchase with the transaction card.

In some embodiments, the plurality of interactive UI elements may also comprise a fifth UI element that enables the card owner to select a time, and/or a time range during which, one or both of: the transaction card; and/or the biometrics-activation control, may be enabled or disabled for use.

With regard to the first UI element, embodiments herein may be configured such that the first UI element 410 may comprise a GUI toggle switch. Here, for example, the toggle switch may be configured such that the card owner may enable or disable the biometric-activated control by a single action therewith. With regard to the second UI element, at 440, embodiments herein may be configured such that the second UI element may comprise a plurality of categories, groups and/or vendors 441 from which the card owner can select, at 442, one or more to exclude from the biometric-activated control. In some embodiments, the vendors may be categorized and displayed in categories or groups that facilitate selection, such as trusted vendors, utilities, vendors that appear regularly in the card owner's transaction history, and/or vendors associated with recurring transactions. According to certain aspects, the second UI element 440 may also be configured to display a plurality of vendors and/or charges associated with the transaction card, the plurality of vendors and charges being configured such that the vendors and charges may be displayed as interactive elements that may be selected by the card owner to be added to transactions that are excluded from the biometric-activated control.

According to various embodiments, the transaction card may be configured to become active (biometrically-active) based on the receipt of correct biometric information at one or more biometric sensor(s). In some implementations, fingerprint information may be detected, for example, by at least one fingerprint reader that is located on one or both sides of the transaction card, and/or an electronic device associated with the card owner. In other implementations, such above-described biometric information may be detected by an electronic device associated with the card owner, such as the card owner's mobile device, and transmitted to one or more of: the transaction card; the at least one computer processor; and/or the portal.

Moreover, according other embodiments, methods disclosed herein may also comprise configuring the transaction card to transmit, upon the biometric-activation of the transaction card, additional electronic information to a transacting device indicating a successful activation of the transaction card was established based on the verified biometrics information.

Further, embodiments herein may be configured such that the transaction card may be configured to remain biometrically-active for a predetermined time period after the transaction card becomes biometrically-activated. In some implementations, the transaction card may be configured to remain biometrically-active for a time period that automatically expires after the predetermined time period from the receipt of verified biometrics information. Here, for example, the predetermined time period may be specified by the card owner. In one embodiment, the predetermined time period may be specified as about 5 minutes to about 15 minutes. For another example, alternatively or additionally, the predetermined time period may be specified as having different durations for different types of transactions, such as 10 minutes for a restaurant transaction. In other embodiments, the transaction card may be configured to remain biometrically-active until a predetermined number of transactions are completed after the transaction card becomes biometrically-active. In some implementations, the predetermined number of transactions may be one transaction; in other implementations, the predetermined number of transactions may be specified by the card owner.

Turning back to FIG. 3, the fraud prevention process 300 may include, at 304, a step of determining whether the transaction card is biometrically-active. According to disclosed innovations, step 304 may be performed in connection with a transaction associated with the specific vendor with which the transaction card is being used. In some embodiments, the biometric-based approval for a transaction may only be initiated if the biometric-activated control is enabled and the specific vendor is not excluded from the biometric-activated control.

Various embodiments herein may be configured such that step 304 may comprise verifying, upon the receipt of a request to authorize a charge to the transaction card, that the transaction card has been activated. In some embodiments, the transaction card may have been activated by receipt of verified biometrics information at the time when the transaction is being initiated. Here, for example, such request to authorize may have been initiated at a POS device, and the transaction card 110 may then verify that it has been properly activated via confirmation of acceptable biometric information, e.g., obtained after the request to authorize was generated by the POS device.

According to other embodiments, prior to verifying that the transaction card has been activated, methods disclosed herein may also comprise configuring the transaction card: (i) with an input that enables the transaction card to verify the biometrics information; and/or (ii) to transmit data including validation information that provides a primary authentication the transaction card is active for use. In some embodiments, the above-described verifying that the transaction card has been activated may further comprise a second verification of the biometrics information that is requested, processed or completed, where such second verification may be performed in connection with an application resident on an electronic device of the card owner (e.g., mobile device) associated with the transaction card.

According to various embodiments, methods herein may also comprise additional processing to enable completion of the transaction based on the determination. In some implementations, such additional processing may comprise transmitting an electronic communication that enables completion of the transaction. Here, for example, an electronic communication that enables completion of the transaction may be transmitted from a transaction card to a POS device.

Moreover, in some embodiments, methods herein may also comprise transmitting, to a transacting device, an electronic communication comprising a secondary authentication that confirms whether or not the transaction card is active for use.

Further according to some embodiments, methods herein may also comprise determining whether the charge being authorized may include an additional amount (e.g., service charge, transaction charge, tax, tip, gratuity, etc.) that requires processing after the transaction at the point of sale occurs; and/or automatically authorizing, when the transaction at the point of sale occurs, payment of the additional amount regardless of an activation state of the transaction card at a later time when the additional amount is determined or submitted for payment. In some embodiments, methods herein may also comprise configuring the transaction card to transmit, upon the biometric-activation of the transaction card, additional electronic information to the POS device indicating a successful activation of the transaction card was established based on the verified biometrics information.

Moreover, particularly when the charge being authorized is determined to include an additional amount, methods disclosed herein may further comprise performing a secondary authorization. In some embodiments, the secondary authorization may comprise generating verification information regarding the additional amount, the verification information being configured for transmission to the card owner to enable the card owner to verify that the additional amount is correct. In implementations, one or both of the performing of the secondary authorization and generating the verification information may be performed by at least one computer processor. Further in implementations, the verification information may be configured for transmission to one or both of: the portal; and/or a device (e.g., mobile device, etc.) of the card owner; and/or may comprise an interactive feature, such as a button or UI action or prompt, that enables the card owner to dispute that the additional amount should be paid.

Here, it is noted that the disclosed systems, platforms, transaction cards, methods, and computer-readable media include or involve a fraud prevention mechanism that may include and/or involve a software application configured to perform various automated functionality set forth herein. Unlike conventional software and solutions, present innovations utilize improved fraud prevention mechanisms that may, via the use of biometric information, be configured to determine whether a transaction card is biometrically-active for a transaction involving the transaction card as well as to provide various functionality related to controlling biometric-related activation aspects of the card, users, and/or type of approved purchases. In these and other manners, implementations involving features such as the biometric transaction card and associated software are empowered with fraud prevention mechanisms that represent an improvement over conventional fraud prevention associated with transaction cards.

The disclosed software improves utilization of both processing and communication resources, such as by allowing a card owner to control biometric-activation of the transaction card, as well as determining whether the transaction card is biometrically active to proceed with authorized and/or approved transaction(s) involving the card. Moreover, various improvement of the presently-disclosed prevention mechanisms improve efficiency, accuracy, robustness, autonomousness and fault-tolerance aspects of fraud prevention; and reduces likelihood of user exposure to frauds involving transaction cards, thereby reducing or eliminating unnecessary and/or inefficient and inaccurate processing related to otherwise attempting to prevent fraud or mitigation the results of fraud after it has occurred.

Figure 5:
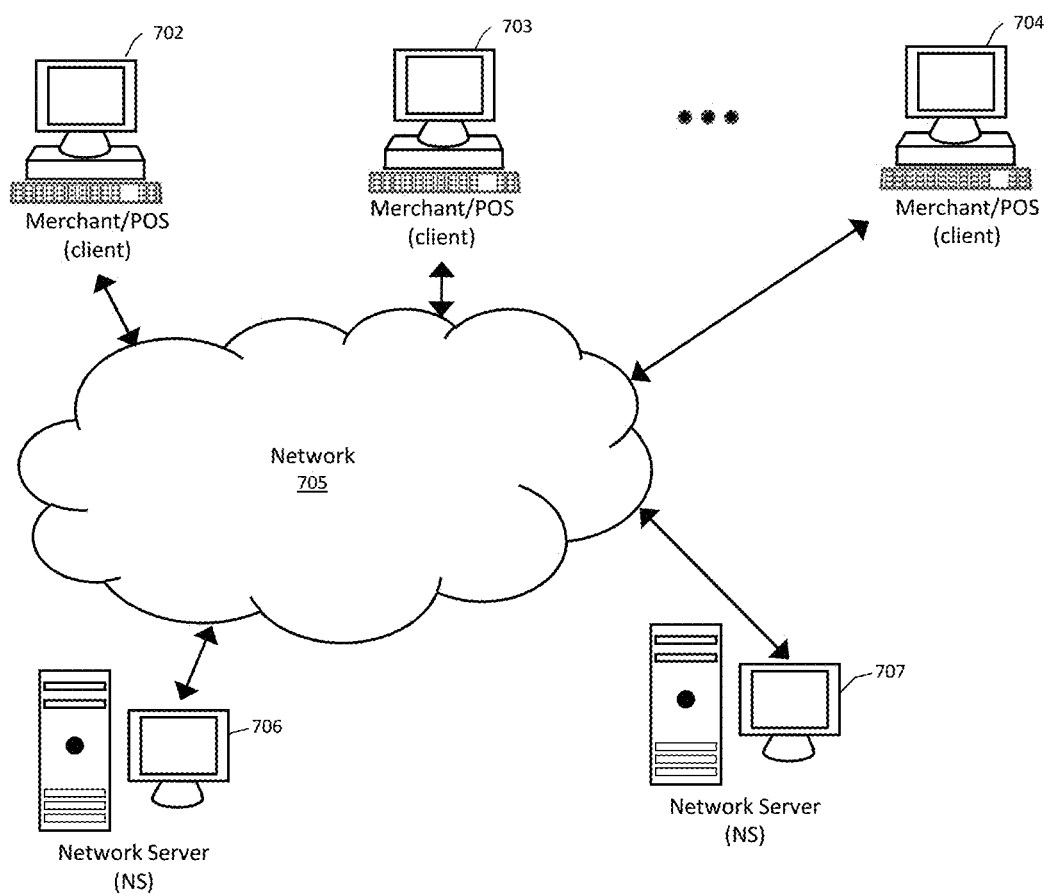
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
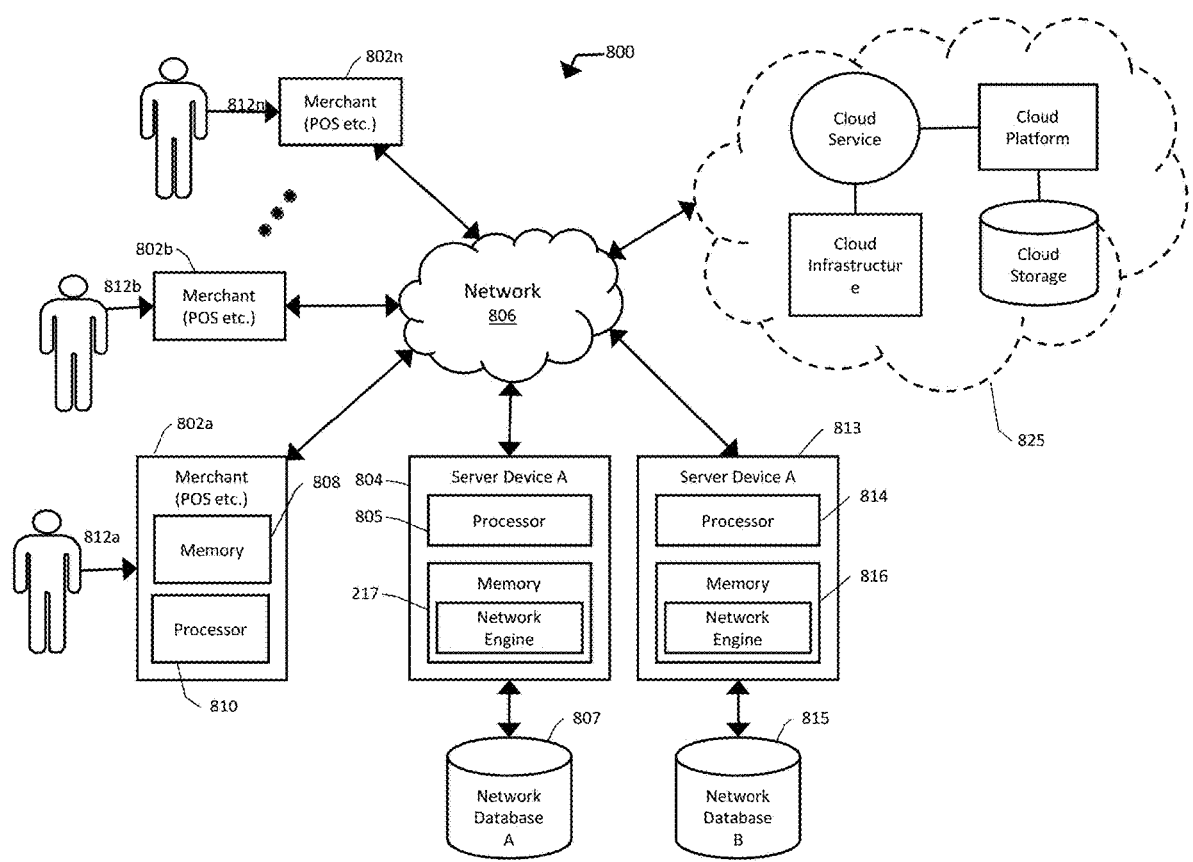
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b through 802n shown each at least includes a computer-readable medium, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806. As shown in FIG. 6, exemplary server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
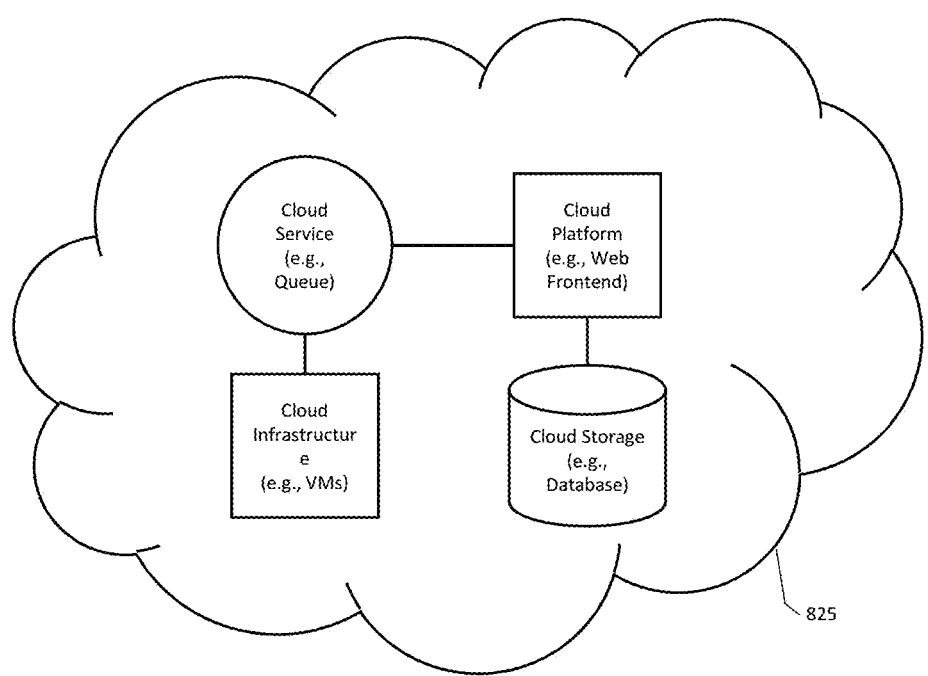
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
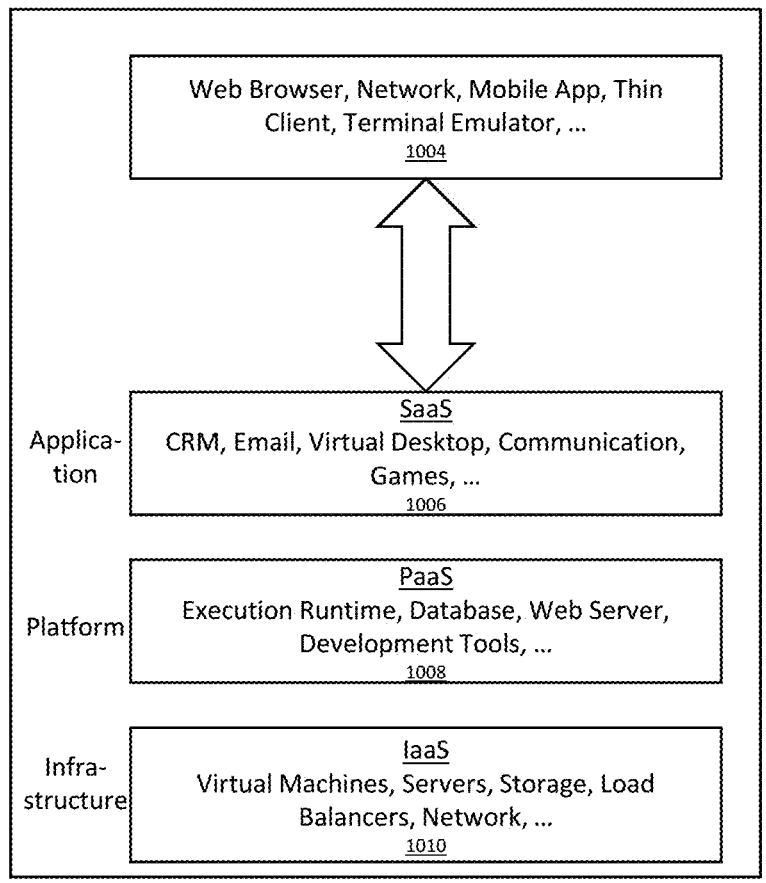

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/ or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). Computer-related systems, computer systems, and systems, as used herein, include any combination of hardware and software.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; ×86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
generating, by at least one computer processor, a first user interface having a plurality of interactive UI elements that enable a card owner to manage a plurality of features associated with a transaction card associated with the card owner;
wherein the plurality of interactive UI elements comprises:
a first UI element that is configured to allow the card owner to enable a biometric-activated control of the transaction card; and
a second UI element that is configured to allow the card owner to exclude one or more vendors from the biometric-activated control; and
determining, by the at least one computer processor, in connection with a transaction associated with a vendor and using the transaction card, if the biometric-activated control is enabled and the vendor is not excluded from the biometric-activated control, whether the transaction card is biometrically-active.

Clause 2. The method of clause 1 or of any clause herein, further comprising:
enabling, by the at least one computer processor, in connection with the transaction associated with the vendor and using the transaction card, if the biometric-activated control is enabled and the vendor is not excluded from the biometric-activated control, completion of the transaction based on the determination.

Clause 3. The method of clause 2 or of any clause herein, wherein enabling, by the at least one computer processor, completion of the transaction comprises:
transmitting, by the at least one computer processor, an electronic communication that enables completion of the transaction.

Clause 4. The method of clause 1 or of any clause herein, wherein the plurality of interactive UI elements further comprises:
a third UI element that is configured to allow the card owner to indicate a date range, a time range, or both to temporarily disable the biometric-activated control.

Clause 5. The method of clause 4 or of any clause herein, wherein the third UI element is further configured to allow the card owner to indicate whether the date range, the time range, or both, are recurring.

Clause 6. The method of clause 1 or of any clause herein, wherein the transaction card is configured to remain biometrically-active for a predetermined time period after the transaction card becomes biometrically-active.

Clause 7. The method of clause 6 or of any clause herein, wherein the predetermined time period can be specified by the card owner.

Clause 8. The method of clause 1 or of any clause herein, wherein the transaction card is configured to remain biometrically-active until a pre-determined number of transactions are completed after the transaction card becomes biometrically-active.

Clause 9. The method of clause 8 or of any clause herein, wherein the pre-determined number of transactions is one transaction.

Clause 10. The method of clause 8 or of any clause herein, wherein the pre-determined number of transactions can be specified by the card owner.

Clause 11. The method of clause 1 or of any clause herein, wherein the first UI element comprises a toggle switch.

Clause 12. The method of clause 1 or of any clause herein, wherein the first UI element is configured to also allow the card owner to disable the biometric-activated control of the transaction card.

Clause 13. The method of clause 1 or of any clause herein, wherein the second UI element comprises a plurality of vendors from which the card owner can select one or more to exclude from the biometric-activated control.

Clause 14. The method of clause 1 or of any clause herein, wherein the plurality of interactive UI elements further comprises:
a fourth UI element that is configured to allow the card owner to provide biometric information for biometrically-activating the transaction card.

Clause 15. The method of clause 14 or of any clause herein, wherein the biometric information for biometrically-activating the transaction card may correspond to one or more individuals other than the card owner.

Clause 16. The method of clause 14 or of any clause herein, wherein the biometric information includes fingerprint information, facial information, or both fingerprint information and facial information.

Clause 17. The method of clause 1 or of any clause herein, wherein the transaction card is configured to become biometrically-active based on receipt of biometric information.

Clause 18. The method of clause 17 or of any clause herein, wherein the biometric information includes fingerprint information that can be received by the transaction card.

Clause 19. The method of clause 17 or of any clause herein, wherein the biometric information includes facial information that can be received by a device associated with the card owner.

Clause 20. The method of clause 17 or of any clause herein, wherein the biometric information includes eye information that can be received by a device associated with the card owner.

Clause 21. A computer-implemented method comprising:
generating, by at least one computer processor, a first user interface having a plurality of interactive UI elements that enable a card owner to manage a plurality of features associated with a transaction card associated with the card owner;
wherein the plurality of interactive UI elements comprises:
a first UI element that is configured to allow the card owner to enable a biometric-activated control of the transaction card; and
a second UI element that is configured to allow the card owner to exclude one or more recurring transactions from the biometric-activated control; and
determining, by the at least one computer processor, in connection with a transaction using the transaction card, if the biometric-activated control is enabled and the transaction is not a recurring transaction excluded from the biometric-activated control, whether the transaction card is biometrically-active.

Clause 22. The method of clause 21 or of any clause herein, wherein the transaction card is configured to remain biometrically-active for a predetermined time period after the transaction card becomes biometrically-active.

Clause 23. The method of clause 21 or of any clause herein, wherein the transaction card is configured to remain biometrically-active until a pre-determined number of transactions are completed after the transaction card becomes biometrically-active.

Clause 24. The method of clause 23 or of any clause herein, wherein the pre-determined number of transactions is one transaction.

Clause 25. The method of clause 21 or of any clause herein, wherein the plurality of interactive UI elements further comprises:
a fourth UI element that is configured to allow the card owner to provide biometric information for biometrically-activating the transaction card.

Clause 26. The method of clause 25 or of any clause herein, wherein the biometric information includes fingerprint information, facial information, or both fingerprint information and facial information.

Clause 27. The method of clause 21 or of any clause herein, wherein the transaction card is configured to become biometrically-active based on receipt of biometric information.

Clause 28. The method of clause 27 or of any clause herein, wherein the biometric information includes fingerprint information that can be received by the transaction card.

Clause 29. The method of clause 27 or of any clause herein, wherein the biometric information includes facial information that can be received by a device associated with the card owner.

Clause 30. The method of clause 27 or of any clause herein, wherein the biometric information includes eye information that can be received by a device associated with the card owner.

Clause 31. A computer-implemented method comprising:
providing, by at least one computer platform, a portal by which customers manage online accounts related to biometric-activated transaction cards;
generating, by the at least one computer platform, as part of the portal, a first user interface having a plurality of interactive UI elements that enable a respective card owner to manage a plurality of activity controlling features associated with a biometric activation of a respective biometric-activated transaction card associated with the respective card owner;
wherein the plurality of interactive UI elements comprises:
a first UI element that is configured to allow the card owner to enable or disable a biometric-activated control of the respective transaction card;
a second UI element that is configured to allow the card owner to exclude one or both of at least one vendor and at least one charge, from the biometric-activated control; and
a third UI element that is configured to allow the card owner to specify one or both of a date and a time that the biometric-activated control of the respective transaction card is enabled or disabled;
verifying, at the at least one computer platform, upon receipt of a request to authorize a charge to the respective transaction card that the respective transaction card has been activated;
wherein the respective transaction card has been activated by utilizing a receipt of verified biometrics information when the respective transaction has been initiated;
wherein the request to authorize has been initiated at a point of sale (POS) device; and
transmitting, by the at least one computer platform, to the POS device, an electronic communication indicating whether the transaction card is active to proceed with the respective transaction.

Clause 32. The method of clause 31 or of any other clause herein, further comprising:
configuring the respective transaction card to transmit, upon the biometric-activation of the respective transaction card, additional electronic information to the POS device indicating a successful activation of the transaction card was established based on the verified biometrics information.

Clause 33. The method of clause 31 or of any other clause herein, wherein the transaction card is configured to remain active during a time period that automatically expires after a predetermined time period from the receipt of verified biometrics information.

Clause 34. The method of clause 33 or of any other clause herein, wherein the predetermined time period may one or both of:
have a duration selected by the card owner; and
be specified as having different durations for different types of transactions.

Clause 35. The method of clause 31 or of any other clause herein, wherein the transaction card is automatically deactivated after an approved transaction is successfully processed.

Clause 36. The method of clause 31 or of any other clause herein, wherein the first UI element comprised a toggle switch by which the card owner may enable or disable the biometric-activated control by a single action.

Clause 37. The method of clause 31 or of any other clause herein, wherein the second UI element comprises a list of merchants that the card owner has approved to be excluded from the biometric-activated control.

Clause 38. The method of clause 31 or of any other clause herein, wherein the second UI element comprises a list of merchants and charges associated with the transaction card, the list of merchants and charges being configured such that the merchants and charges are displayed as interactive elements that may be selected by the card owner to be added to transactions that are excluded from the biometric-activated control.

Clause 39. The method of clause 31 or of any other clause herein, wherein the plurality of interactive UI elements further comprise:
a fourth UI element by which the card owner may approve usage of the transaction card by one or more additional individuals that have biometrics information associated with the transaction card, wherein the usage approval enables an approved individual to activate the transaction card by providing a biometric input that is verified as present in the biometrics information associated with the transaction card.

Clause 40. The method of clause 39 or of any other clause herein, wherein the fourth UI element comprises one or more of:
a first option that enables the card owner to select a date or date range regarding which the transaction card may be enabled or disabled for the approved individual;
a second option that enables the card owner to select a time or time range regarding which the transaction card may be enabled or disabled for the approved individual; and
a third option that enables the card owner to select one or more of merchants, merchant types, transactions, transaction types, and goods that are either included or excluded from those that the card-owner authorizes the approved individual to purchase with the transaction card.

Clause 41. The method of clause 31 or of any other clause herein, wherein the plurality of interactive UI elements further comprise:

a fifth UI element that enables the card owner to select a time or time range during which one or both of the transaction card and the biometrics-activation control may be enabled or disabled for use.

Clause 42. The method of clause 31 or of any other clause herein, wherein the transaction card is configured to be activated by biometric inputs comprising one or more of:

a fingerprint detected at least one fingerprint reader that is located on one or both sides of the transaction card and an electronic device associated with the card owner;

facial recognition detected by an electronic device associated with the card owner and transmitted to one or more of the transaction card, the at least one computer platform, and the portal; and eye recognition detected by an electronic device associated with the card owner and transmitted to one or more of the transaction card, the at least one computer platform, and the portal.

Clause 43. The method of clause 31 or of any other clause herein, further comprising:

determining whether the charge being authorized may include an additional amount [e.g., tip, tax, gratuity, etc.] that requires processing after the transaction at the point of sale occurs;

automatically authorizing, when the transaction at the point of sale occurs, payment of the additional amount regardless of an activation state of the transaction card at a later time when the additional amount is determined or submitted for payment.

Clause 44. The method of clause 43 or of any other clause herein, further comprising:

performing, via the at least one computer platform, a secondary authorization process when the charge being authorized is determined to include an additional amount, the secondary authorization process comprising:

generating, by the at least one computer platform, verification information regarding the additional amount, the verification information being configured for transmission to the card owner to enable the card owner to verify that the additional amount is correct.

Clause 45. The method of clause 44 or of any other clause herein, wherein the verification information one or both of:

(i) is configured for transmission to one or both of the portal and a mobile device of the card owner; and (ii) comprises an interactive feature that enables the card owner to dispute that the additional amount should be paid.

Clause 46. A computer-implemented method comprising:

providing, by at least one computer platform, a portal by which customers manage online accounts related to biometric-activated transaction cards;

generating, by the at least one computer platform, as part of the portal, a first user interface having a plurality of interactive UI elements that enable a card owner to manage features associated with biometric-activation of a transaction card associated with the card owner;

wherein the plurality of interactive UI elements comprise:

a first UI element by which the card owner may enable or disable biometric-activated control of the transaction card;

a second UI element that enables the card owner to exclude certain vendors or charges from the biometric-activated control; and a third UI element that enables the card owner to specify one or both of a date and a time that the biometric-activated control of the transaction card is enabled or disabled;

configuring the transaction card: (i) with an input that enables the transaction card to verify the biometrics information, and (ii) to transmit data including validation information that provides a primary authentication the transaction card is active for use;

verifying, at the at least one computer platform, upon receipt of a request to authorize a charge to the transaction card initiated via a transaction at a point of sale (POS) device, that the transaction card was activated by receipt of a verified biometrics input when the transaction was initiated; and transmitting, by the at least one computer platform, to the POS device, an electronic communication comprising a secondary authentication that confirms whether or not the transaction card is active for use.

Clause 47. The method of clause 46 or of any other clause herein, wherein the verifying further comprises:

a second verification of the biometrics information that is requested, processed or completed in connection with an application resident on a mobile device of the card owner associated with the transaction card.

Clause 48. The method of clause 46 or of any other clause herein, further comprising:

configuring the respective transaction card to transmit, upon the biometric-activation of the respective transaction card, additional electronic information to the POS device indicating a successful activation of the transaction card was established based on the verified biometrics information.

Clause 49. The method of clause 46 or of any other clause herein, wherein the transaction card is configured to remain active during a time period that automatically expires after a predetermined time period from the receipt of verified biometrics information.

Clause 50. The method of clause 49 or of any other clause herein, wherein the predetermined time period may one or both of:

have a duration selected by the card owner; and be specified as having different durations for different types of transactions.

Clause 51. The method of clause 56 or of any other clause herein, wherein the transaction card is automatically deactivated after an approved transaction is successfully processed.

Clause 52. The method of clause 46 or of any other clause herein, wherein the first UI element comprised a toggle switch by which the card owner may enable or disable the biometric-activated control by a single action.

Clause 53. The method of clause 46 or of any other clause herein, wherein the second UI element comprises a list of merchants that the card owner has approved to be excluded from the biometric-activated control.

Clause 54. The method of clause 46 or of any other clause herein, wherein the second UI element comprises a list of merchants and charges associated with the transaction card, the list of merchants and charges being configured such that the merchants and charges are displayed as interactive elements that may be selected by the card owner to be added to transactions that are excluded from the biometric-activated control.

Clause 55. The method of clause 46 or of any other clause herein, wherein the plurality of interactive UI elements further comprise:

a fourth UI element by which the card owner may approve usage of the transaction card by one or more additional individuals that have biometrics information associated with the transaction card, wherein the usage approval enables an approved individual to activate the transaction card by providing a biometric input that is verified as present in the biometrics information associated with the transaction card.

Clause 56. The method of clause 55 or of any other clause herein, wherein the fourth UI element comprises one or more of:

a first option that enables the card owner to select a date or date range regarding which the transaction card may be enabled or disabled for the approved individual;

a second option that enables the card owner to select a time or time range regarding which the transaction card may be enabled or disabled for the approved individual; and a third option that enables the card owner to select one or more of merchants, merchant types, transactions, transaction types, and goods that are either included or excluded from those that the card-owner authorizes the approved individual to purchase with the transaction card.

Clause 57. The method of clause 46 or of any other clause herein, wherein the plurality of interactive UI elements further comprise:

a fifth UI element that enables the card owner to select a time or time range during which one or both of the transaction card and the biometrics-activation control may be enabled or disabled for use.

Clause 58. The method of clause 46 or of any other clause herein, wherein the transaction card is configured to be activated by biometric inputs comprising one or more of:

a fingerprint detected at least one fingerprint reader that is located on one or both sides of the transaction card and an electronic device associated with the card owner;

facial recognition detected by an electronic device associated with the card owner and transmitted to one or more of the transaction card, the at least one computer platform, and the portal; and eye recognition detected by an electronic device associated with the card owner and transmitted to one or more of the transaction card, the at least one computer platform, and the portal.

Clause 59. The method of clause 46 or of any other clause herein, further comprising:

determining whether the charge being authorized may include an additional amount that requires processing after the transaction at the point of sale occurs;

automatically authorizing, when the transaction at the point of sale occurs, payment of the additional amount regardless of an activation state of the transaction card at a later time when the additional amount is determined or submitted for payment.

Clause 60. The method of clause 59 or of any other clause herein, further comprising:

performing, via the at least one computer platform, a secondary authorization process when the charge being authorized is determined to include an additional amount, the secondary authorization process comprising:

generating, by the at least one computer platform, verification information regarding the additional amount, the verification information being configured for transmission to the card owner to enable the card owner to verify that the additional amount is correct.

Clause 61. The method of clause 60 or of any other clause herein, wherein the verification information one or both of:

(i) is configured for transmission to one or both of the portal and a mobile device of the card owner; and (ii) comprises an interactive feature that enables the card owner to dispute that the additional amount should be paid.

Clause 62. Embodiments herein may also take the form of a system comprised of components such as computing and/or computer-related elements that are arranged, programmed and/or otherwise adapted to perform the features and functionality set forth anywhere above. Such computing elements may include and/or involve computer readable media.

Clause 63, Embodiments herein may also take the form of a transaction card and/or components or electronic/computing elements associated therewith, configured, programmed and/or otherwise adapted to perform the features and functionality set forth anywhere above.

Clause 64. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
generating, by at least one computer processor, a first user interface having a plurality of interactive UI elements that enable a card owner to manage a plurality of features associated with a transaction card that is associated with the card owner and comprises one or more sensors configured to receive biometric information of the card owner during a use of the transaction card for a transaction, wherein the plurality of interactive UI elements comprises:
  a first UI element that is configured to allow the card owner to enable a biometric activated control of the one or more sensors of the transaction card, wherein an operation of the biometric activated control is based on biometric information collected from at least one of: the one or more sensors of the transaction card or a device associated with the transaction card or the card owner; and
  a second UI element that is configured to allow the card owner to exclude one or more vendors from being subject to the biometric-activated control; and
determining, by the at least one computer processor, in connection with a transaction associated with a vendor, who is subject to the biometric-activated control, and the transaction card, that the one or more sensors of the transaction card are biometrically-active based on an operation status of if the biometric-activated control.

2. The method of claim 1, further comprising:
enabling, by the at least one computer processor, in connection with the transaction associated with the vendor and using the transaction card, if the biometric-activated control is enabled and the vendor is not excluded from the biometric-activated control, completion of the transaction based on the determination.

3. The method of claim 2, wherein enabling, by the at least one computer processor, completion of the transaction comprises:
transmitting, by the at least one computer processor, an electronic communication that enables completion of the transaction.

4. The method of claim 1, wherein the plurality of interactive UI elements further comprises:
a third UI element that is configured to allow the card owner to indicate a date range, a time range, or both to temporarily disable the biometric-activated control.

5. The method of claim 4, wherein the third UI element is further configured to allow the card owner to indicate whether the date range, the time range, or both, are recurring.

6. The method of claim 1, wherein the transaction card is configured to remain biometrically-active for a predetermined time period after the transaction card becomes biometrically-active.

7. The method of claim 6, wherein the predetermined time period can be specified by the card owner.

8. The method of claim 1, wherein the transaction card is configured to remain biometrically-active until a predetermined number of transactions are completed after the transaction card becomes biometrically-active.

9. The method of claim 8, wherein the predetermined number of transactions is one transaction.

10. The method of claim 8, wherein the predetermined number of transactions can be specified by the card owner.

11. The method of claim 1, wherein the first UI element comprises a toggle switch.

12. The method of claim 1, wherein the first UI element is configured to also allow the card owner to disable the biometric-activated control of the transaction card.

13. The method of claim 1, wherein the second UI element comprises a plurality of vendors from which the card owner can select one or more to exclude from the biometric-activated control.

14. The method of claim 1, wherein the plurality of interactive UI elements further comprises:
another UI element that is configured to allow the card owner to provide biometric information for biometrically-activating the transaction card.

15. The method of claim 14, wherein the biometric information for biometrically-activating the transaction card may correspond to one or more individuals other than the card owner.

16. The method of claim 14, wherein the biometric information includes fingerprint information, facial information, or both fingerprint information and facial information.

17. The method of claim 1, wherein the transaction card is configured to become biometrically-active based on receipt of biometric information.

18. The method of claim 17, wherein the biometric information includes fingerprint information that can be received by the transaction card.

19. The method of claim 17, wherein the biometric information includes facial information that can be received by a device associated with the card owner.

20. A computer-implemented method comprising:
generating, by at least one computer processor, a first user interface having a plurality of interactive UI elements that enable a card owner to manage a plurality of features associated with a transaction card that is associated with the card owner and comprises one or more sensors configured to receive biometric information of the card owner during a use of the transaction card for a transaction,
wherein the plurality of interactive UI elements comprises:
a first UI element that is configured to allow the card owner to enable a biometric-activated control of the one or more sensors of the transaction card, wherein an operation of the biometric activated control is based on biometric information collected from at least one of: the one or more sensors of the transaction card or a device associated with the transaction card or the card owner; and
a second UI element that is configured to allow the card owner to exclude one or more recurring transactions from being subject to the biometric-activated control; and
determining, by the at least one computer processor, in connection with a transaction using the transaction card, that the one or more sensors of the transaction card are biometrically-active based on an operation status of the biometric-activated control.

* * * * *